(12) United States Patent
Albrecht et al.

(10) Patent No.: US 7,601,960 B2
(45) Date of Patent: Oct. 13, 2009

(54) CONTROL FOR UV WATER DISINFECTION

(75) Inventors: Andy Albrecht, Shaker Heights, OH (US); Larry Fish, Prospect, KY (US); Sam DuPlessis, Louisville, KY (US); Timothy E. Chen, Aurora, OH (US)

(73) Assignee: General Electric Company, Schenectady, NY (US)

( * ) Notice: Subject to any disclaimer, the term of this patent is extended or adjusted under 35 U.S.C. 154(b) by 299 days.

(21) Appl. No.: 11/648,193

(22) Filed: Dec. 29, 2006

(65) Prior Publication Data

US 2008/0156738 A1 Jul. 3, 2008

(51) Int. Cl.
*C02F 1/32* (2006.01)
*B01D 21/30* (2006.01)

(52) U.S. Cl. .............. 250/365; 250/372; 250/432 R; 250/436; 250/461.1; 250/504 R; 356/51; 422/24; 210/748; 210/85

(58) Field of Classification Search .............. 250/364, 250/365, 372, 373, 428, 432 R, 435, 436, 250/461.1, 504 R; 356/51, 928, 955; 422/24, 422/28; 210/748, 143, 85, 98
See application file for complete search history.

(56) References Cited

U.S. PATENT DOCUMENTS

| | | | | |
|---|---|---|---|---|
| 4,336,223 A | | 6/1982 | Hillman | |
| 5,187,413 A | * | 2/1993 | Araki et al. | 315/291 |
| 5,230,792 A | * | 7/1993 | Sauska et al. | 210/97 |
| 5,324,423 A | * | 6/1994 | Markham | 210/87 |
| 5,610,477 A | * | 3/1997 | Ivanov et al. | 313/573 |
| 5,859,952 A | * | 1/1999 | Levine et al. | 392/405 |
| 6,057,917 A | | 5/2000 | Petersen et al. | |
| 6,200,466 B1 | * | 3/2001 | Bender | 210/96.1 |
| 6,274,988 B1 | * | 8/2001 | De Vries | 315/307 |
| 6,583,422 B2 | | 6/2003 | Boehme | |
| 6,773,584 B2 | | 8/2004 | Saccomanno | |
| 7,068,361 B2 | * | 6/2006 | Cimino et al. | 356/213 |
| 7,089,763 B2 | * | 8/2006 | Forsberg et al. | 62/635 |
| 7,373,787 B2 | * | 5/2008 | Forsberg et al. | 62/285 |
| 7,396,459 B2 | * | 7/2008 | Thorpe | 210/205 |
| 7,462,945 B2 | * | 12/2008 | Baarman et al. | 290/43 |
| 2003/0165398 A1 | * | 9/2003 | Waldo et al. | 422/22 |
| 2004/0027075 A1 | * | 2/2004 | Hataoka et al. | 315/115 |
| 2005/0000911 A1 | * | 1/2005 | Thorpe | 210/748 |
| 2008/0156738 A1 | * | 7/2008 | Albrecht et al. | 210/748 |
| 2008/0257272 A1 | * | 10/2008 | Bolda | 119/72 |
| 2009/0095691 A1 | * | 4/2009 | Thorpe | 210/748 |

* cited by examiner

*Primary Examiner*—Bernard E Souw
(74) *Attorney, Agent, or Firm*—Fay Sharpe LLP

(57) ABSTRACT

A UV light source water disinfection system includes a UV light source that is driven or controlled by a ballast. Improved start-up scenarios are provided by use of a separate heating wire around the lamp or employing an inductive-coupled system to provide initial high power requirements. The UV lamp is discontinuously operated in order to extend the life of the system, save energy, and periodically dose standing water to prevent regeneration of undesired microorganisms.

17 Claims, 1 Drawing Sheet

CONTROL FOR UV WATER DISINFECTION

BACKGROUND OF THE INVENTION

This disclosure relates generally to a control system and more particularly to a ballast control for a light source treatment system of fluids such as an ultraviolet (UV) treatment of water commonly used in a home water treatment system.

It is known in the art that UV light sources can be used to treat or disinfect/sterilize water such as described in commonly owned U.S. Pat. No. 6,057,917, the disclosure of which is incorporated herein by reference. Low-pressure mercury vapor discharge lamps, for example, have been widely used for many years for this purpose. Ultraviolet disinfection systems typically expose water to UV radiation (light) such that the radiation passes through the water and advantageously doses any microorganisms in the water. The UV radiation or light disrupts the DNA of the microorganisms which impacts on reproduction and thereby renders the microorganisms harmless. Of course, the intensity and duration of the UV exposure can impact whether a proper dose of UV radiation is provided to assure adequate treatment of the water.

Typical systems keep the ultraviolet source, usually a lamp, in the "on" condition at all times. This insures that the water is always disinfected whether there is high or low flow through the system, and even if there is no flow in which case the standing water and any potential microorganisms therein are continuously dosed by the emitted UV light. It will be appreciated, however, that if water demand is infrequent and there are long periods of time where there is often standing water or low flow conditions, then the lamp is wasting energy. In addition, the always "on" lamp has a corresponding shorter system life.

Another problem with known systems is that a UV emitting lamp that is always "on" can unfortunately heat the water in the reactor/reservoir during low flow or static operation of the system. Generally, the undesired heating impacts on customer satisfaction. Further, the heating can cause the ultraviolet output to decrease, risking tripping the alarm on the UV intensity monitor.

Thus, a need exists to operate the UV lamp in a non-continuous manner in an effort to eliminate false alarms, prevent needless heating of the water, reduce energy costs, extend useful life of the UV lamp in the system, and still provide sufficient disinfection.

A problem with the non-continuous ultraviolet output systems is that a slow or gradual rise in bringing the lamp to an "on" condition when power is supplied to the lamp, can increase the risk of passing contaminated water through the system. That is, insufficient exposure of the water to the UV could occur as the lamp is warming up, and the system otherwise permits the water to leave the reservoir without a desired level of UV dosing.

BRIEF DESCRIPTION OF THE INVENTION

This disclosure relates to an ultraviolet water disinfection system, and particularly a control and method for controlling the system.

The system includes a UV light source for emitting UV light into a fluid and a ballast lamp operation to provide a non-continuous dose to the water in response to certain conditions.

The time required to achieve full lamp output is minimized after the lamp has been in an off or low power state.

Sufficient heating is maintained in the UV lamp so that a starting voltage can be more quickly applied to the lamp.

In an alternative arrangement, an inductively coupled discharge system is used so that conventional cathodes do not degrade in response to initial high power requirements.

A supplemental heating wire, integral to the system, may be used to maintain sufficient lamp temperature but limit significant heating of the water.

If power levels drop below a desired UV dosage level, the controller actuates an alarm and also begins overdriving the lamp to assure continued UV disinfection before ultimate failure of the lamp.

A primary advantage of the disclosure resides in the improvement of time required to maximum light output of the UV reactor system.

Another advantage relates to preventing dark repair and growth of microorganisms, particularly in low flow or static conditions.

Supplemental heating of the discharge lamp is also provided to maintain mercury vapor pressure at start time.

DETAILED DESCRIPTION OF THE INVENTION

Figure 1:
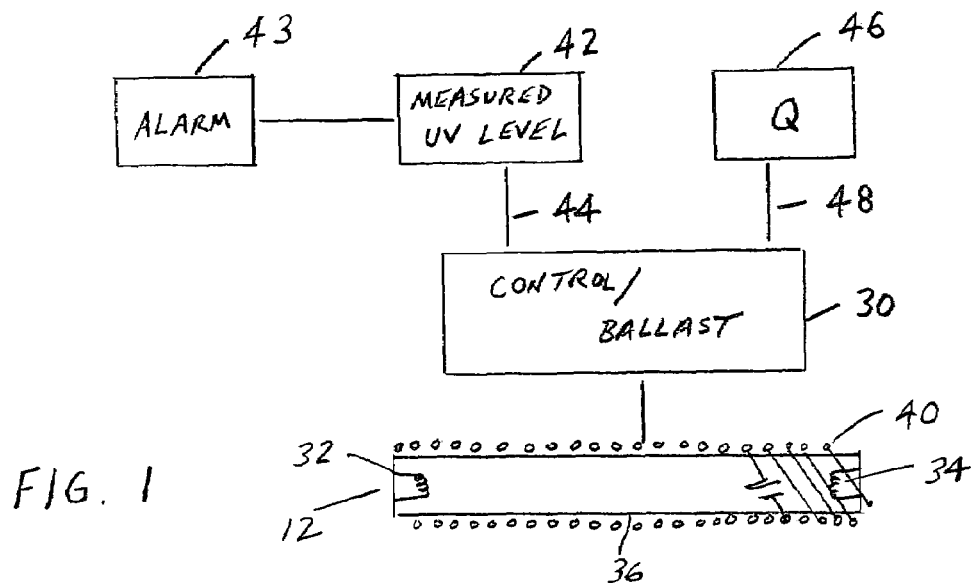
FIG. 1 is a schematic representation of a UV water disinfection system according to a preferred embodiment.

An ultraviolet light source water disinfection system is generally shown in FIG. 1. It includes a UV light source 12 received in a chamber, reactor, or reservoir 14 illustrated in dotted line. The lamp may be physically received within the chamber, or may emit light through a window into the chamber that holds a fluid, such as water. Inlet 16 supplies new water to the reservoir while outlet 18 provides UV dosed water for a downstream use (not shown). Since it is desired to provide for non-continuous or periodic operation of the lamp, rather than maintaining the lamp in an on condition, and in order to conserve energy, a ballast 30 controls operation of the lamp and provides the starting power necessary to strike an arc between the cathodes 32, 34 of the lamp. In a manner generally known in the art, the arc is established between the lamp cathodes, and a gas fill in lamp envelope 36 is excited and emits the desired wavelength of radiation or light. In the particular instance, the system requires light in the ultraviolet spectrum in order to dose or treat the water, and particularly disinfect or sterilize the microorganisms that may be carried in the water.

There is a desire to minimize the time to bring the lamp to a full "on" condition, particularly after the lamp has either been "off" or at a low power status. One manner of achieving this is to use heating wire 40 that is integral to the system and maintains sufficient lamp temperature, but does not adversely impact or significantly heat the water. For example, the heating wire 40 can be wrapped directly around the lamp. Thus, when the system senses a demand, for example from a flow sensor, etc., a starting voltage is applied to the lamp from the ballast and the lamp is brought to operational temperature more quickly since the lamp has been heated by the wire. By providing some heating to the lamp cathodes, the mercury vapor pressure is higher than without heating and allows the lamp to come to a full output more quickly, especially in colder environments. Additionally, for a predetermined time at the start of the lamp, additional current can be supplied by the ballast to maintain a required level of UV output. Thereafter, the cathode power could be removed, or left on under normal system operation.

The ballast may receive a signal relating to measured UV level and a sensor may allow an alarm 43 to be selectively activated, and/or provide signal 44 to the ballast which controls operation of the lamp. Alternatively, or in conjunction with the measured UV level sensor 42, a flow sensor 46, for example associated with the outlet 18 from the reservoir, will provide a signal 48 to the ballast. By providing for a quick start-up of the lamp, immediate disinfection of the water at the start of flow from the UV reactor is achieved. Likewise, continued disinfection can be provided, particularly as water flows through the system.

In those instances where there is low flow or static operation of the system, continued disinfection may not be desired. Therefore, the ballast will provide for discontinuous or non-continuous UV output. This provides better energy savings, as well as providing control of microbiological contaminants. By periodically dosing the water, the microorganisms are prevented from undergoing dark repair or growth.

When there is no discharge flow through the system, sufficient cathode heating can be maintained in the UV lamp so when the system senses demand from the flow sensor 46, a starting voltage can be immediately applied to the lamp. The control ballast could also provide variable power to the lamp depending on the flow rate of the system and measured level of UV to attain the UV dose requirements needed for disinfection. By measuring the minimum level of UV in the water, the effect of most the physical properties of the water do not need to be measured separately. This greatly simplifies the control system.

Figure 2:
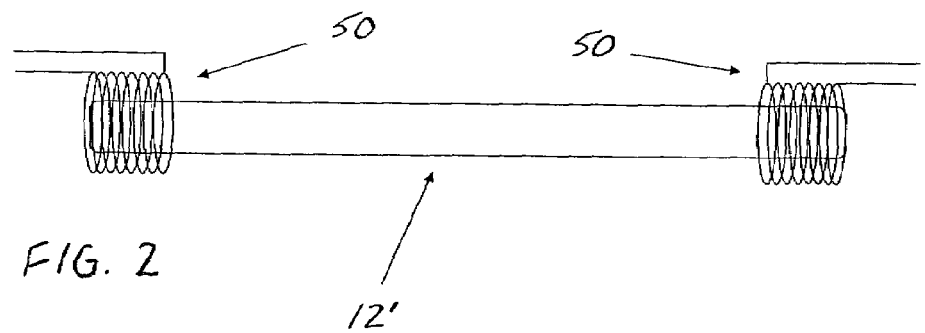
FIG. 2 is an alternative embodiment of a start up arrangement for the UV lamp.

FIG. 2 illustrates the a lamp 12' that does not have any cathodes, i.e., the lamp is just a sealed glass or quartz envelope with no electrical connections which can be easily replaced at end of life since there are no electrical connections to be concerned with. Rather than employing the heating wire 40 of FIG. 1, an inductively-coupled arrangement provides desired start up. The inductive arrangement is a way to pump a lot of power into the lamp in a short amount of time at the early start-up stage. The induction system preferably employs coils 50 wrapped around opposite ends of the lamp 12'. Use of the coils is advantageous since conventional cathodes (such as in a lamp 12 as shown in FIG. 1) typically degrade in response to high power requirements. Here, however, the system, and particularly the lamp 12', can be overdriven via the coils at start-up to achieve the desired output in a short time.

Figure 3:
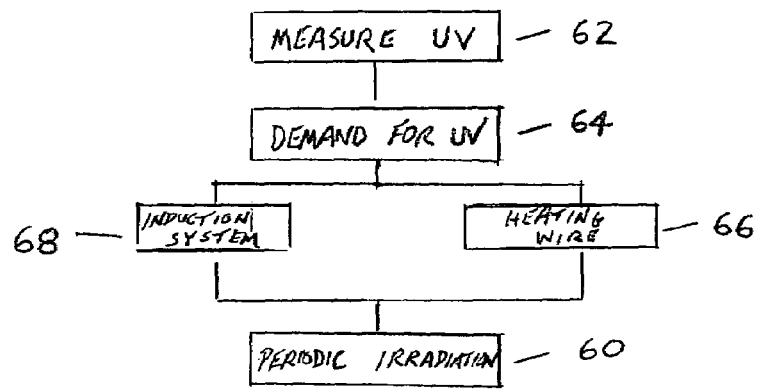
FIG. 3 is a flow chart of the logic associated with the control in the lamp ballast.

As represented in FIG. 3, it is known that some microorganisms have the ability to self-repair under no low UV light conditions. During a low flow state, logic can be provided through the ballast or control so that the system periodically irradiates the stagnant water to maintain disinfection levels. Thus, as shown in step 60, the UV lamp is operated in a non-continuous manner, so that the water is only periodically dosed, and significant-cost savings associated with reduced energy consumption are achieved. Likewise, the overall life of the lamp for use in the system is extended since the lamp is not maintained in continuous operation. Information can be stored in the system so that the UV level is measured via a conventional sensor as represented at 62, compared or input to a controller that includes information regarding a desired demand 64 for UV level, and the heating wire/induction system 66, 68 non-continuously/periodically operates the lamp as represented in step 60. This scenario may be repeated depending on the flow, temperature, time, measured UV levels, etc., or still other parameters to provide feedback control to optimize the UV dose, prevent regeneration of microorganisms, and minimize heating of the reactor.

It is also desirable to have the ballast overdrive the lamp if the measured UV level drops below a desired UV dose level. That is, in addition to the alarm 43 being actuated in FIG. 1, the information is conveyed to the ballast where the lamp is then operated in an overdrive situation. This provides the user additional time, e.g., a few extra days, of UV disinfection before ultimate failure of the lamp to meet the required dosage of UV is encountered.

In summary, control electronics 60 provide a desired start up scenario and dwell status that allow the system 10 to achieve desired output and effectively disinfect water traveling through the reactor at the beginning of a cycle. It is also envisioned that temperature sensing may be employed to provide further information to the ballast 60 and control of the lamp operation. Likewise, alternative manners of providing supplemental heat to the lamp 12 can be used without departing from the scope and intent of the disclosure. That is, the heating wire 40 and induction coil 50 are not the only manners in which supplemental heating can be provided to the lamp, and similar arrangements that achieve the same goals are deemed to fall within the intent of the present invention.

The invention has been described with reference to the preferred embodiments. Obviously, modifications and alterations will occur to others upon reading and understanding the preceding detailed description. It is intended that the invention be construed as including all such modifications and alterations.

What is claimed is:

1. An ultraviolet light source water disinfection system, said system comprising:
   an ultraviolet light source designed to emit ultraviolet light and dimensioned for one of at least partial receipt within and mounting adjacent an associated fluid reservoir used to store fluid
   a control ballast operatively associated with the light source for regulating power allocated to the ultraviolet light source; and
   means separate from the control ballast, for heating the UV light source for improving start up of the lamp.

2. The system of claim 1 further comprising a flow sensor that detects fluid flow and provides an input to the ballast for controlling the light source.

3. The system of claim 1 wherein the ballast includes means for discontinuously operating the UV light source.

4. The system of claim 1 wherein the ballast includes means for overdriving the lamp in response to insufficient UV dosage of the water.

5. The system of claim 4 further comprising an alarm that is selectively actuated in response to insufficient UV dosage of the water.

6. The system of claim 1 further comprising an alarm that is selectively actuated in response to insufficient UV dosage of the water.

7. The system of claim 1 wherein the heating means includes a heating wire.

8. The system of claim 7 wherein the heating wire is wrapped about the light source to maintain sufficient lamp temperature.

9. The system of claim 1 wherein the heating means is an inductively coupled discharge system.

10. A method for operating a lamp designed to emit ultraviolet light and dimensioned for one of at least partial receipt within and mounting adjacent an associated fluid reservoir comprising:

providing an ultraviolet light source;

exposing water to UV radiation emitted from the light source;

measuring flow output demand into a fluid reservoir using a flow sensor;

heating the ultraviolet light source in order to maintain sufficient mercury vapor pressure and minimizing the time required for full lamp output when the lamp has been in an off or low power status; and providing power to the ultraviolet light source after the heating step to operate the ultraviolet light source.

11. The method according to claim 10 further comprising reducing the power when reaching the optimal ultraviolet output.

12. The method according to claim 10 further comprising supplying additional current to said ultraviolet output at start-up sufficient to maintain the required level of ultraviolet output.

13. The method according to claim 10 further comprising providing a control ballast that supplies variable power to said ultraviolet output that is based upon ultraviolet level and flow rate.

14. The method according to claim 10 wherein the heating step includes providing inductively-coupled starting for the UV light source.

15. The method according to claim 10 wherein method of heating includes providing a separate heating wire.

16. The method according to claim 10 further comprising overdriving the light source in response to UV light level dropping below a predetermined level.

17. The method of claim 16 further comprising actuating an alarm to signify the UV light level dropping below a predetermined level.

* * * * *